Figure 1:
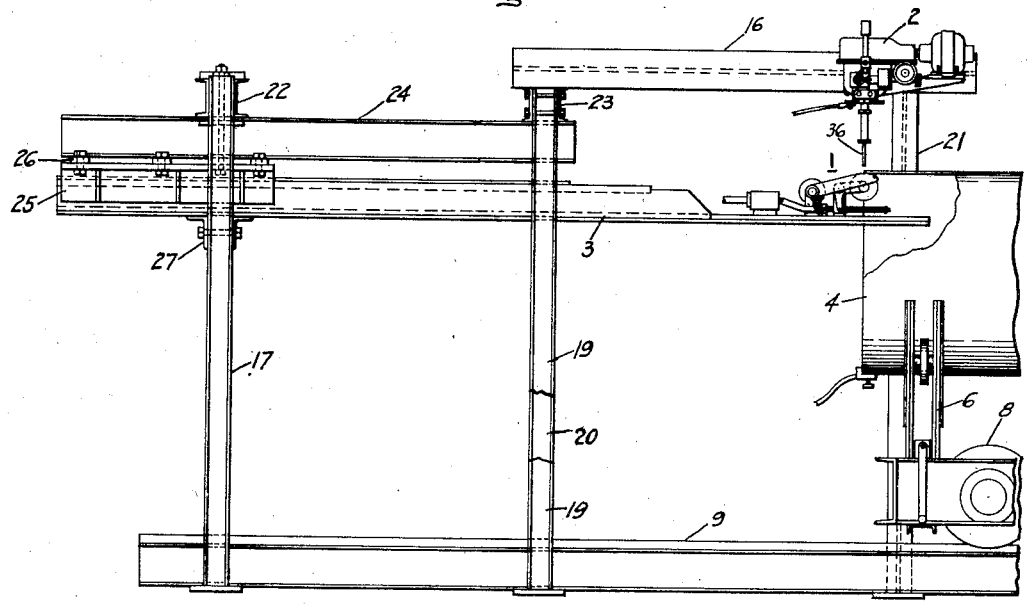

Nov. 8, 1932.  V. J. CHAPMAN  1,886,524
ELECTRIC ARC WELDING
Filed Dec. 13, 1929   3 Sheets-Sheet 1

Inventor:
Verni J. Chapman,
by Charles E. Mullen
His Attorney.

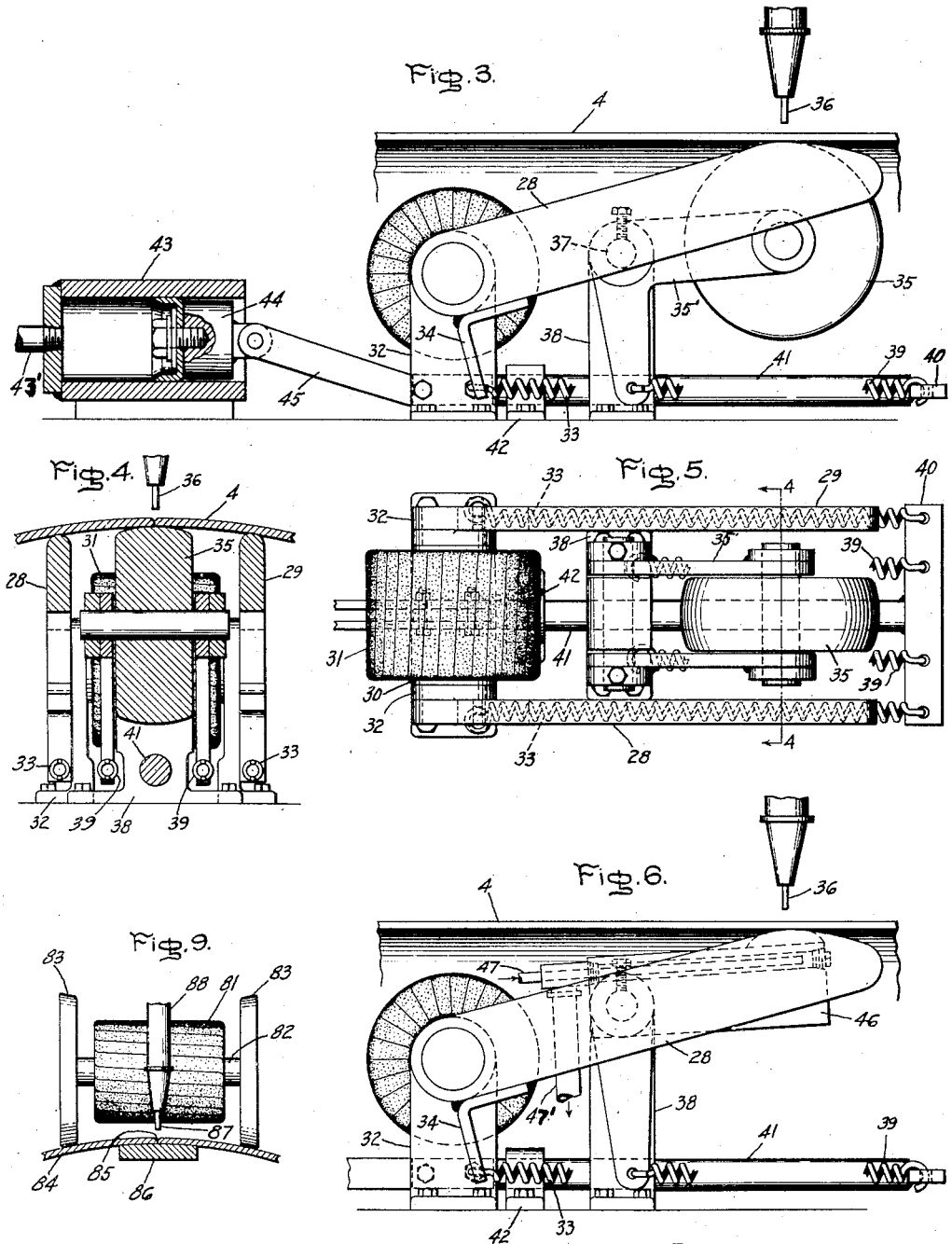

Nov. 8, 1932.     V. J. CHAPMAN     1,886,524
ELECTRIC ARC WELDING
Filed Dec. 13, 1929     3 Sheets-Sheet 3

Inventor:
Verni J. Chapman,
by Charles E. Millar
His Attorney.

Patented Nov. 8, 1932

1,886,524

UNITED STATES PATENT OFFICE

VERNI J. CHAPMAN, OF SCHENECTADY, NEW YORK, ASSIGNOR TO GENERAL ELECTRIC COMPANY, A CORPORATION OF NEW YORK

ELECTRIC ARC WELDING

Application filed December 13, 1929. Serial No. 413,848.

My invention relates to electric arc welding and more particularly to apparatus for controlling the action of the electric arc.

During the operation of welding it has been found that the arc tends to blow and wander about somewhat at different points along the seam. This unsteadiness or instability of the arc seems to be the result of variations in the magnetic field surrounding the arc at different points along the seam. It has been found that the greatest difficulty is encountered at the beginning and at the end of a seam. For example, when the ground connection is made at the end of the work part from which the welding operation is started, at the beginning of the welding operation the arc has a tendency to blow forward and at the end of the welding operation the arc has a tendency to blow backwards, while in the middle of the work it is fairly stable. It is desirable to have the arc deflected forward in the direction of its travel. If the arc is deflected backward proper penetration may not be secured and the arc may be extinguished by the electrode coming into contact with the edge of the arc crater.

It is an object of my invention to provide means for stabilizing the arc during the welding operation.

It is a further object of my invention to provide means for establishing a magnetic field in the work and across the seam being welded which will act upon the arc partially submerged in its crater to deflect it in the direction of its travel along the seam being welded.

It is a further object of my invention to provide a magnetic control device of simplified construction which is effective only in the immediate vicinity of the welding arc with which it is associated. Such a device may be used with a single arc with respect to which it may be adjusted to secure the best results or it may be used for conveniently controlling a plurality of welding arcs operating on the same workpiece.

It is a further object of my invention to provide a combined stabilizing device and backing up means in which the parts are relatively movable so as to take care of surface inequalities in the work at and in the vicinity of the seam so that the seam may be properly backed up at all times and the proper magnetic field established to correctly influence the arc.

It is a further object of my invention to control automatically the energization of the magnetic stabilizing device so that the device may take care of the various conditions encountered during any particular welding operation.

My invention will be better understood from the following description when considered in connection with the accompanying drawings and its scope will be pointed out in the appended claims.

Figure 2:
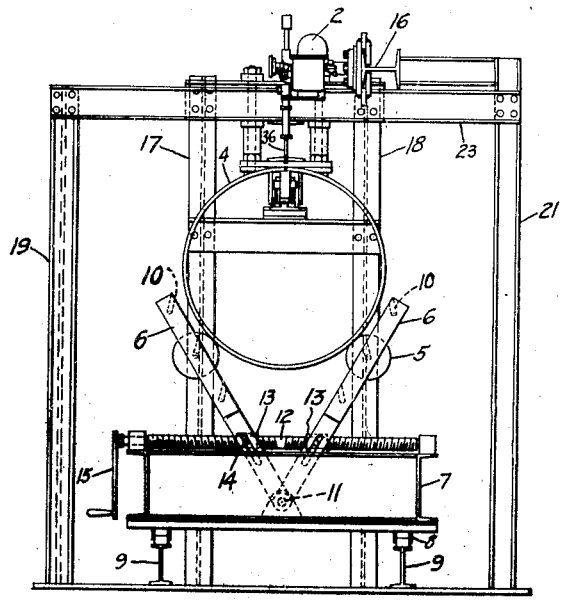
Figure 10:
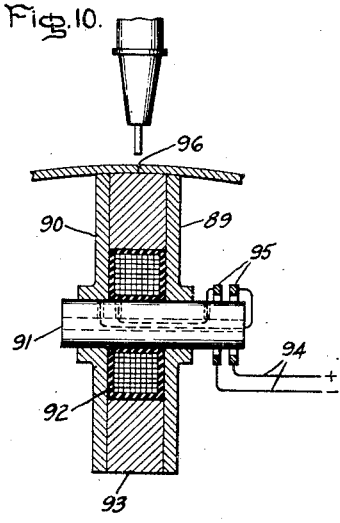
Figure 7:
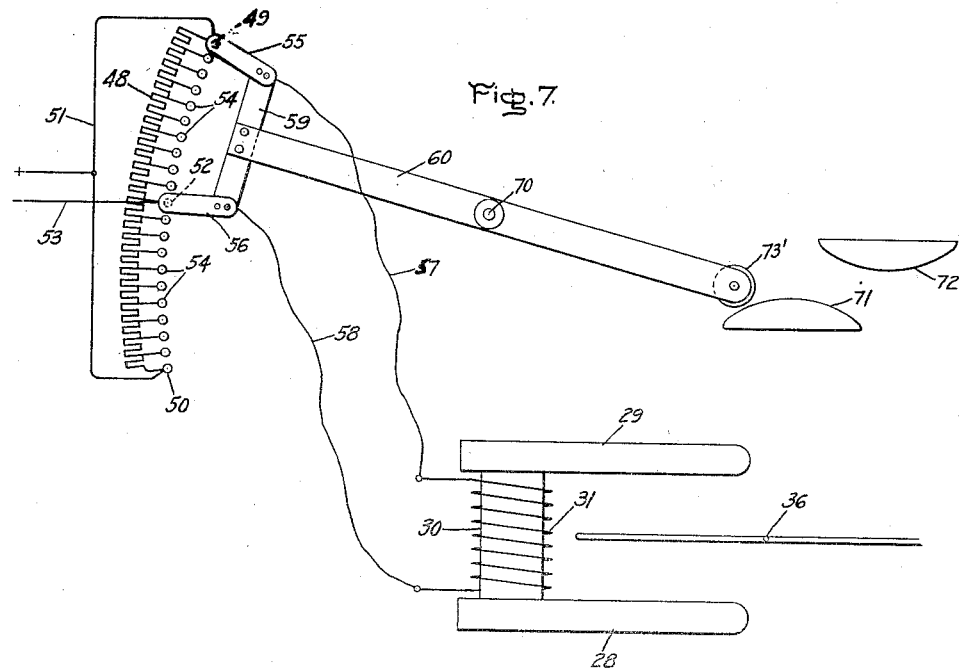
Figure 8:
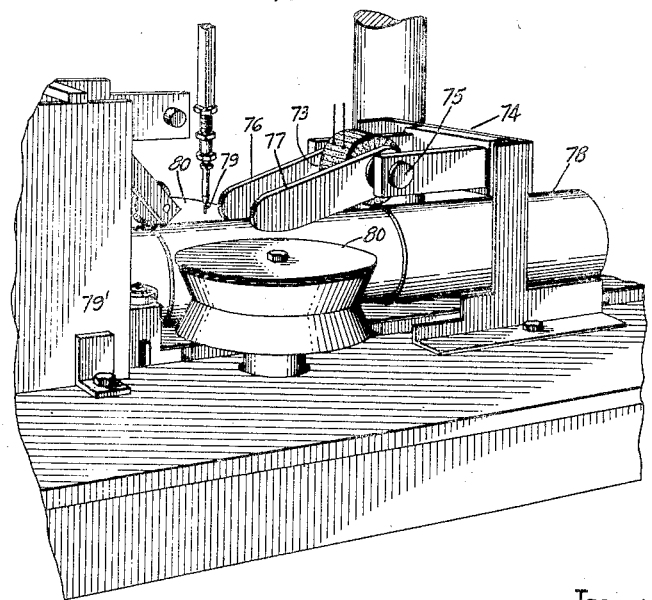

Referring to the drawings, Figs. 1 and 2 are different views of an arc welding machine in which my invention has been embodied; Figs. 3, 4 and 5 are detail views of that form of my invention employed in the machine of Figs. 1 and 2; Fig. 6 is a modification of the device shown in Figs. 3, 4 and 5; Fig. 7 diagrammatically represents the electrical connections and one means that may be employed for automatically controlling during the welding operation the excitation of my magnetic control device in accordance with the position of the work in the welding machine; Fig. 8 illustrates another arrangement of my magnetic control device in another welding machine; and Figs. 9 and 10 show other devices embodying my invention.

In Figs. 1 and 2 my magnetic control device is shown at 1. It is supported immediately below the welding head 2 on a fabricated beam 3 in such manner that the work 4 may be moved between it and the welding head. In the particular modification illustrated in Figs. 1 and 2 the device comprises not only the magnetic stabilizing device but also a backing up means for backing up the seam immediately below the point of welding. The particular construction of the device will be pointed out in connection with the description of Figs. 3, 4 and 5 wherein it is illustrated in detail.

Referring to Figs. 1 and 2, the work 4 is carried on rollers 5 located in slotted arms 6 which are supported in a carriage 7. This carriage is provided with wheels 8 adapted to rest on a track 9 extending along and in the same direction as the beam 3 upon which the magnetic control device of my invention is supported. The carriage is preferably self propelled by means of an electric motor and transmission mechanism (not shown) located in the carriage although other suitable means may be used for moving the carriage relatively to the welding head. The arms 6 are adjustable to and from each other and are provided with a plurality of slots 10 for the reception of the rollers 5 so as to accommodate work pieces of different sizes. The arms 6 are pivotally supported in the carriage 7 at 11 and may be moved to and from each other by an adjusting means comprising a screw 12 and the nuts 13. The nuts 13 are attached to the arms 6 through a pin and slot connection 14 and may be moved from one another along the length of the screw 12 by turning the screw in one direction or the other by means of a crank handle 15.

The welding head 2 is attached to a supporting beam 16 forming part of the fabricated framework of the welding machine which is also used to support the beam 3 on which the magnetic control device is located. This fabricated framework comprises five vertically disposed beams 17, 18, 19, 20 and 21. The beams 17, 18, 19 and 20 support horizontal members 22 and 23 from which is suspended a horizontal member 24 to the left end of which is bolted the left end of the beam 3. The attachment is made through the agency of angle plates 25 and strips 26 attached to the beam 24. Further support is given to the beam 3 by angles 27 bolted to the vertical members 17 and 18. Members 19, 20 and 21 are spaced on each side of the track a sufficient distance to allow free passage of the carriage 7 with the work 4 supported thereon into the machine as the work 4 is traversed relatively to the welding head 2 during the welding operation.

The magnetic control device 1 shown in Figs. 1 and 2 is illustrated in greater detail in Figs. 3, 4 and 5. It comprises an electromagnet having work engaging portions or pole pieces 28 and 29 joined to one another by a yoke 30 on which is located an exciting coil 31. The electromagnet as a whole is supported in brackets 32 and each work engaging member 28 and 29 is independently movable about the axis of the yoke or core 30. Each member 28 and 29 is forced into yielding engagement with the work 4 through the agency of springs 33 connected to brackets 34 attached thereto. Located between the work engaging portions of the electromagnets 28 and 29 is a backing up roller 35 which is adapted to engage the work immediately below the welding electrode 36 and back up the seam at that point during the welding operation. This roller is supported on a shaft carried by bellcrank members 35' which are themselves pivoted on a shaft 37 carried by brackets 38. Brackets 38 and 32 are mounted on the end portion of the beam 3 illustrated in Fig. 1 and preferably insulated therefrom. The roller 35 is held in engagement with the work 4 by means of springs 39 acting on the free ends of the bellcrank members 35' which permits the roller to tilt slightly and accommodate itself to irregularities in the work. Springs 33 and 39 are both connected to a crosshead 40 attached to the right hand end of a rod 41 which is supported in a bearing 42 located between brackets 32 and 38 and mounted on but preferably insulated from the end of beam 3. The rod 41 and the crosshead 40 may be moved to the right or left by means of an electromagnet or an air engine as illustrated comprising a cylinder 43 and a piston 44 which is connected to the rod 41 by a link 45. This motor mechanism is likewise preferably insulated from the member 3. The admission of air into the cylinder 43 through a pipe 43' from a source of supply under the control of the operator will cause the piston 44 to move to the right which in turn will cause the crosshead 40 connected thereto through the agency of rod 40 and link 45 also to move to the right. Movement of the crosshead 40 to the right stresses the springs 33 and 39 which causes the backing up roller 35 and the work engaging portions of the electromagnets 28 and 29 to be brought into yielding engagement with the under side of the work 4. It will be noted that by reason of the independent support of the work engaging members of the electromagnet and the backing up roller these members are free to move relatively to one another and will accommodate themselves to surface inequalities in the work. It will also be noted that the magnetic control device is electrically insulated from the beam 3. This construction has been adopted to prevent the welding current flowing through the device and disturbing the functioning of the device.

Instead of using a roller such as illustrated in Figs. 3, 4 and 5 a sliding member 46, as shown in Fig. 6, may be used. When such an arrangement is used it is generally necessary to provide means for cooling the work engaging portion of the backing up slide member and in Fig. 6 one arrangement has been illustrated for effecting this purpose. In the arrangement shown there water or other cooling fluid is supplied to the interior of the backing up slide 46 at its point of engagement with the work through a pipe 47 and discharged therefrom through a pipe 47'.

The operation of the device shown in Figs. 3 to 6 is as follows: The electromagnet is suitably excited by supplying current to its coil 31. A flux or field is thus generated which passes through the work engaging portions 28 and 29 of the electromagnet and through that portion of the work in the immediate vicinity of the welding arc maintained at the terminal of the electrode 36. This flux oppositely magnetizes parts 28 and 29 and the work immediately adjacent these parts. It is for the most part in the work 4 at the point of welding and is in a position to effectively control the arc which is partially buried in the work in its crater. As has been pointed out above, it is generally desirable to establish a field in such a direction as to cause the arc to be deflected in a forward direction or downward. When a device such as illustrated in Figs. 3 to 6 is used it is possible to control very closely the direction and strength of the magnetic field employed in controlling the arc. As will be pointed out in connection with Fig. 7, this control may be made automatic where the same kind of work is being operated on as in production work.

One of the particular advantages of the magnetic control device illustrated resides in the fact that the control is exerted on the particular arc which it is desired to control and the controlling action does not extend to arcs located in its immediate vicinity. Thus in operations where it is desirable to lay down several beads of deposited metal on the same seam it is possible to independently control a plurality of arcs independent of one another when using devices according to my invention. When only a single arc is used, as in the machine illustrated in Figs. 1 and 2, the simplicity of the device, the ability to adjust it relatively to the welding arc and the effectiveness of its action in establishing a field in the work where it is desired to have the field to secure the best influence on the arc, renders it superior to devices previously used in controlling electric arcs during welding operations. When the magnetic device is used in connection with a backing up roller, as shown in Figs. 3 and 5, or a backing up slide, as shown in Fig. 6, the free relative movement of the backing up member and the magnetic member renders the device able to take care of surface inequalities in the work and makes it unnecessary to firmly clamp the work parts in adjusted position.

In Fig. 7 I have diagrammatically illustrated one form of mechanism which may be used with a machine such as shown in Figs. 1 and 2 to control in an appropriate manner the excitation of a device according to my invention during any particular welding operation performed in the machine. The exciation of the electromagnet 31 is controlled by a potentiometer rheostat 48, the terminals 49 and 50 of which are connected together by a conductor 51 which in turn is connected to the plus terminal of a source of supply. The midpoint 52 of the resistor 48 is connected by a conductor 53 to the negative terminal of the source of supply. Between the terminals 49, 52 and 50 are a plurality of tap terminals 54. Connections are made between the various terminals of the rheostat 48 and the coil 31 of the magnetic control device through contact members 55 and 56 and conductors 57 and 58. The contact members 55 and 56 are insulated from each other and carried by member 59 attached to an arm 60 which may be pivoted at 70 to a stationary part of the welding machine with which the control device is associated. When the arm 60 is pivoted to a stationary portion of the machine a plurality of cams 71, 72, of which only two are shown in the diagrammatic illustration in Fig. 7, is attached to a movable portion of the machine such as the work carriage 7 of the machine shown in Figs. 1 and 2. The cams 71 and 72 are so located relative to the arm 60 that the cam follower 73' attached thereto will be engaged by the cams during the welding operation when the carriage is being moved relative to the frame of the welding machine on which the arm 60 may be supported. Depending upon the adjustment of the cams 71, 72, etc. the arm 60 will be moved about the pivot 70 and will cause the contacts 56 and 55 to engage various terminals on the rheostat 48. This operation will cause the excitation of the coil 31 to be varied in accordance with the adjustment of the cams 71, 72, etc. For example, it will be noted in Fig. 7 that when the arm 60 is in the position illustrated with the contacts 55 and 56 making engagement with the terminals 49 and 52 of the rheostat, current is sent through the coil 31 of the magnetic control device in one direction whereas when the arm 60 is thrown into a position where contacts 55 and 56 engage the terminals 52 and 50 current will be sent through the coil 31 in the opposite direction. Intermediate these two terminal positions the contacts will engage taps having an equal potential and no current will flow through the coil 31. It will thus become apparent that by properly adjusting the cams 71, 72, etc. in accordance with the control desired to be exercised over given portions of the work during the welding operation it will be possible to control exactly the energization of the electromagnetic control device in order to secure the best conditions for welding throughout the length of the seam. For example, as has been pointed out above, when the ground connection is made at the end of the work part from which the welding operation is started at the beginning of the welding operation the arc has a tendency to blow forwards and at the end of the welding operation to blow backwards. By properly adjusting the cams 71 and 72 the electromagnetic control device may be excited to control or neutralize these tendencies at the beginning and at the end of the seam. By properly positioning other cams such as 71 and 72, corresponding to intermediate positions of the seam, it is possible to control the energization of the electromagnetic device so as to secure the proper operation of the arc throughout the entire welding operation. It will be apparent that the attachment of the arm 60 and the cams 71, 72, etc. may be reversed from that given by way of illustration above and that other arrangements may be resorted to in place of the particular one illustrated to control the energization of the electromagnetic control device in accordance with the position of the arc along the length of a seam being welded.

In Fig. 8 I have illustrated another arrangement of my magnetic control device in a welding machine. The particular machine illustrated in Fig. 8 is designed for welding the frame structures of a dynamo electric machine such as are used for starters in automobiles. Because of the small size of the frame the magnetic control device has been so arranged as to engage the exterior of the frames rather than their interiors. In Fig. 8 the magnetic control device 73 has been supported in a framework 74 about the axis of its core 75 so that the work engaging portions of the device 76, 77 fall upon and engage the upper portions of the work parts 78 on each side of the seam and slightly in advance of the arcing terminal of the electrode 79. The work parts 78 are fed in properly aligned position by a mechanism illustrated at 79' between the feed rolls 80 which also act as pressure rolls. The control device 73 has been displaced laterally with respect to the arcing terminal 79 of the electrode so that it is not capable of exerting control on the arc until a small portion of the welding on each frame 78 has been initiated. It has been found that in the particular case under consideration the welding operation progresses much better if no control is exerted during the first inch or so of the welding operation. However, after an inch or so has been welded the frame 78 is fed into contact with the work engaging portions 76 and 77 of the electromagnetic device 73 and control is exerted by this device on the arc during the rest of the welding operation on each frame fed beneath the arc by the rolls 80.

It is generally desirable to position the magnetic control device for adjustment relative to the arcing terminal of the welding electrode. In the particular instance just described it has been found best to have the control device engage the work ahead of the arc. Sometimes best results are obtained by having it engage the work in back of the arc for in this position the flux is not so fully shunted from the arc by the magnetic path established by the weld between the work parts on each side of the seam. Various kinds of work require different adjustments and the best adjustment is determined by trial. Consequently, it is to be understood that the various devices according to my invention are preferably adjustably positioned in the welding machines in which they are employed.

The particular mechanical arrangements adopted for carrying out my invention may be considerably modified. In Figs. 9 and 10 I have shown other embodiments of my invention.

The device of Fig. 9 comprises an electromagnetic coil 81 surrounding an axle 82 carrying wheels 83 which are adapted to engage the work 84 on each side of the seam 85 which may be supported on its under side by a backing up member 86. The axle 82 and wheels 83 are made of a magnetic material and are properly proportioned to carry a sufficient amount of flux to properly control the arc established between the electrode 87 and the work 84 at the seam 85. The device illustrated in Fig. 9 may be moved by hand along the work immediately in advance or back of the welding arc, or may be attached to some portion of the machine so as to be traversed along the seam at the same rate as the welding arc is traversed therealong. The coil 81 may be divided so as to leave sufficient space between its two portions to accommodate the nozzle 88 through which the electrode 87 is fed to the work in order to allow the wheels 83 to engage the work nearer the arcing terminal of the electrode than would be possible otherwise. By having the wheels 83 engage the work as near as possible to the arcing terminal of the electrode, a more accurate control of the welding arc is insured since the flux between these wheels may be localized in the work at the exact point where it is desired to control the arc.

In Fig. 10, I have illustrated still another embodiment of my invention. In the arrangement there illustrated the magnetic control device has been incorporated in the backing up roller used to support the under side of the seam immediately below the point of welding. The device comprises two disk members 89 and 90 of magnetic material mounted on a shaft 91 of magnetic material about which is also located a coil 92. This coil is located between the disk members 89 and 90 and is surrounded by a disk 93 of non-magnetic material such as copper which serves as the backing up member in the roll constituted by the parts enumerated. Current is supplied to the coil 92 from a source 94 through conductor rings 95, which are connected to the terminals of the coil 92. The device just described is adapted to be forced against the under side of the work at the point of welding or to support the work at that point so that the magnetic members 89, 90 engage the work on opposite sides of the seam 96. The coil 92 is suitably excited to establish the desired magnetic field through the shaft 91, disks 89 and 90, and the work between the disks 89 and 90 on each side of the seam 96. This magnetic field if properly adjusted will control the arc as has been previously pointed out in connection with the modifications illustrated above. The copper disk 93 located between the disks 89 and 90 will engage the work immediately under the seam and function as a backing up member. It will thus become apparent that by adopting the arrangement shown in Fig. 10 the magnetic control device has been embodied in the backing up roller. It may be found desirable and the device may be constructed to allow relative movement between the magnetic disks 89 and 90 and the backing up disk 93 to insure proper engagement of the various parts with the work on each side and immediately back of the seam 96 so that the same results can be secured with the device of Fig. 10 as are secured by the devices shown in Figs. 3 to 6 inclusive.

My magnetic control device may be associated with any type of arc welding machine. In the two instances illustrated above the work has been moved relatively to the welding head and the control device. When the work is held stationary and the arc traversed relatively thereto it is to be understood that suitable mechanism is to be provided for traversing my magnetic control device along the work. For example, the backing up roller and control device of Figs. 3 to 5 may be supported on a carriage which is moved along a track in unison with the carriage supporting the welding head or the roller may be so supported and the magnetic control device attached to the welding head.

I have herein shown and particularly described certain embodiments of my invention for the purpose of explaining its principles and illustrating its applications, but various modifications of the details of construction and arrangement of these embodiments and other applications will readily present themselves to those skilled in the art. I, therefore, wish to cover by the following claims all modifications within the true spirit and scope of my invention.

What I claim as new and desire to secure by Letters Patent of the United States, is:—

1. Apparatus for use in arc welding comprising means for engaging and oppositely magnetizing only those portions of the work on opposite sides of the seam to be welded in the immediate vicinity of the welding arc, means for supporting said means relatively to the work with the work engaging portions thereof in contact with the work and means for traversing the work and said magnetizing means relatively to one another.

2. In combination with means for maintaining an arc between a welding electrode and the work to be welded and means for moving said electrode and said work relative to one another for traversing said arc along a seam in the work, an arc stabilizing device comprising means effective only in the immediate vicinity of the welding arc for engaging and oppositely magnetizing the work on opposite sides of said seam, and means for traversing said stabilizing device and the work relatively to one another at the same rate of speed that said arc is traversed along said seam.

3. In combination with means for maintaining an arc between a welding electrode and the work to be welded and means for moving said electrode and said work relative to one another for traversing said arc along a seam in the work, an arc stabilizing device comprising pole pieces of opposite polarity, means for forcing pole pieces of opposite polarity into engagement with the work on opposite sides of the seam in proximity to the arc and an exciting coil for magnetizing said pole pieces, removed from the arc a sufficient distance to protect said coil from the destructive effect of the heat of said arc, and means for traversing said stabilizing device and the work relatively to one another at the same rate of speed that said arc is traversed along said seam.

4. A welding device comprising a roller for backing up at the point of welding a seam in the work to be welded, a member of magnetic material having work engaging portions on opposite sides of said roller for making contact with the work on each side of said roller, means for establishing a field through said member and the work on each side of said seam between the work engaging portions of said member, and means for forcing said roller and the work engaging portions of said member into yielding contact with the work.

5. In combination with means for backing up a seam in the work to be welded and means for maintaining and traversing relatively to the work a welding arc along the seam, means for engaging and oppositely magnetizing the work on opposite sides of the seam in the immediate zone of activity of the welding arc, and means for traversing said backing means and said magnetizing means as a unit relatively to the work at the same rate of speed that the welding arc is traversed along the seam.

6. A welding device comprising means for backing up at the point of welding a seam between two parts to be welded, means independently movable with respect to said backing means, for engaging and oppositely magnetizing the work on each side of said backing up means, means for forcing said backing means into yielding contact with the work and means for forcing said magnetizing means into yielding contact with the work.

7. In combination with means for maintaining an arc between a welding electrode and the work to be welded and means for moving said electrode and the work relative to one another for traversing said arc along a seam in the work, means for engaging and oppositely magnetizing the work on opposite sides of the seam in proximity to the welding arc, means for electrically insulating said magnetizing means to the flow of welding current therethrough and means for traversing said magnetizing means and the work relatively to one another at the same rate of speed that said arc is traversed along the seam.

8. A welding device comprising means for backing up the work at the point of welding, means for engaging and oppositely magnetizing the work on each side of the backing up means, means for supporting said backing up means and said magnetizing means for independent relative movement, a crosshead, resilient means for independently connecting said backing up means and said magnetizing means to said crosshead, and means for moving said crosshead to force said backing up means and the work engaging portions of said magnetizing means into yielding contact with the work.

9. A device for use in arc welding comprising means for backing up the work at the point of welding, means for engaging and oppositely magnetizing the work on each side of the backing up means, means for forcing said backing up means and the work engaging portions of said magnetizing means into yielding contact with the work and means for electrically insulating said backing up means and said magnetizing means to the flow of welding current through said means.

10. Apparatus for use in arc welding comprising an electromagnet having a work engaging member, means for exciting said electromagnet, means for forcing the work engaging member of said electromagnet into contact with the work in the immediate vicinity of the welding arc, means for traversing said electromagnet relatively to the work at the same rate of speed that the welding arc is traversed relatively to the work, and means for automatically varying the energization of said electromagnet as it is traversed relatively to the work.

11. Apparatus for use in arc welding comprising an electromagnet having work engaging portions constructed and arranged relatively to one another to make contact with the work on each side of the welding arc, means for exciting said electromagnet to polarize said work engaging portions, means for forcing the work engaging portions of said electromagnet of opposite polarity into yielding contact with the work on opposite sides of the welding arc, means for traversing said electromagnet and the work relatively to one another, and means for automatically varying the energization of said electromagnet as it is traversed relatively to the work.

12. Apparatus for use in arc welding comprising an electromagnet having a work engaging portion, means for exciting said electromagnet, means for forcing the work engaging portion of said electromagnet into contact with the work at the point of welding, means for traversing said electromagnet relatively to the work at the same rate of speed that the welding arc is traversed relatively to the work, and means for predetermining a particular variation in the excitation of said electromagnet as it is traversed relatively to the work.

13. Arc welding apparatus comprising electromagnetic means for controlling the welding arc, means for traversing the welding arc and the work relatively to one another, and means for automatically controlling the energization of said electromagnetic means during the welding operation in accordance with the position of the welding arc relative to the work.

14. Arc welding apparatus comprising electromagnetic means for controlling the welding arc, means for traversing the welding arc and the work relatively to one another, means for controlling the excitation of said electromagnetic means, and means for setting said controlling means to predetermine a particular variation in the excitation of said magnetic means in accordance with the position of the welding arc relative to the work.

In witness whereof, I have hereto set my hand this 12th day of December, 1929.

VERNI J. CHAPMAN.